(12) United States Patent
Otake et al.

(10) Patent No.: US 9,062,746 B2
(45) Date of Patent: Jun. 23, 2015

(54) AUTOMATIC TRANSMISSION DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Masahiro Otake, Nishio (JP); Toru Souda, Okazaki (JP); Satoru Kasuya, Nishio (JP); Nobukazu Ike, Kariya (JP); Hiroshi Kato, Kariya (JP); Shinji Oita, Toyota (JP); Masaru Morise, Nukata-gun (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/378,729

(22) PCT Filed: Feb. 27, 2013

(86) PCT No.: PCT/JP2013/055058
§ 371 (c)(1),
(2) Date: Aug. 14, 2014

(87) PCT Pub. No.: WO2013/146032
PCT Pub. Date: Oct. 3, 2013

(65) Prior Publication Data
US 2015/0018158 A1 Jan. 15, 2015

(30) Foreign Application Priority Data
Mar. 26, 2012 (JP) ................................. 2012-069020

(51) Int. Cl.
F16H 3/62 (2006.01)
F16H 3/66 (2006.01)
F16H 3/44 (2006.01)

(52) U.S. Cl.
CPC .. *F16H 3/62* (2013.01); *F16H 3/66* (2013.01); *F16H 2003/442* (2013.01);
(Continued)

(58) Field of Classification Search
CPC ..... F16H 3/62; F16H 3/64; F16H 2200/0065; F16H 2200/2012; F16H 2200/2046
USPC ......................................... 475/277, 282, 288
See application file for complete search history.

(56) References Cited

U.S. PATENT DOCUMENTS 7,713,161 B2 * 5/2010 Kamm et al. ................. 475/282
7,887,457 B2 * 2/2011 Wittkopp et al. ............. 475/277
(Continued)

FOREIGN PATENT DOCUMENTS

JP A-2009-85433 4/2009
JP A-2009-174626 8/2009
(Continued)

*Primary Examiner* — Derek D Knight
(74) *Attorney, Agent, or Firm* — Oliff PLC

(57) ABSTRACT

An automatic transmission device that changes a relative speed between an input and output member. The transmission configured with a first planetary gear mechanism including first to third rotary elements, a second planetary gear mechanism including fourth to sixth rotary elements, a third planetary gear mechanism including seventh to ninth rotary elements, and a fourth planetary gear mechanism including tenth to twelfth rotary elements. A first coupling between the third and eighth rotary element, a second coupling between the fifth and eleventh rotary element, a third coupling between the sixth and twelfth rotary element, a fourth coupling between the seventh and tenth rotary element. A first clutch between the first and third coupling, a second clutch between the first rotary element and the third coupling element, a third clutch between the first and fourth rotary element.

20 Claims, 6 Drawing Sheets

(52) U.S. Cl.
CPC .. *F16H 2003/445* (2013.01); *F16H 2200/0065* (2013.01); *F16H 2200/2012* (2013.01); *F16H 2200/2046* (2013.01); *F16H 2200/2064* (2013.01)

(56) References Cited

U.S. PATENT DOCUMENTS

| | | | |
|---|---|---|---|
| 7,980,985 B2* | 7/2011 | Seo et al. | 475/275 |
| 8,241,169 B2* | 8/2012 | Phillips et al. | 475/282 |
| 2009/0088289 A1 | 4/2009 | Baldwin | |
| 2009/0209389 A1* | 8/2009 | Phillips et al. | 475/276 |
| 2009/0239699 A1* | 9/2009 | Baldwin | 475/276 |
| 2010/0210400 A1* | 8/2010 | Phillips et al. | 475/275 |
| 2010/0210401 A1* | 8/2010 | Phillips et al. | 475/275 |
| 2011/0009229 A1 | 1/2011 | Bauknecht et al. | |
| 2011/0105267 A1* | 5/2011 | Wittkopp et al. | 475/275 |
| 2012/0135835 A1* | 5/2012 | Gumpoltsberger et al. | 475/276 |
| 2012/0172173 A1* | 7/2012 | Wittkopp et al. | 475/277 |

FOREIGN PATENT DOCUMENTS

| | | |
|---|---|---|
| JP | A-2010-203462 | 9/2010 |
| JP | A-2011-80589 | 4/2011 |
| JP | A-2011-513662 | 4/2011 |
| JP | A-2011-149521 | 8/2011 |

\* cited by examiner

FIG. 3

| | C1 | C2 | C3 | B1 | B2 | B3 | GEAR RATIO | STEP RATIO |
|---|---|---|---|---|---|---|---|---|
| 1 | | O | | O | O | | 5.819 | |
| 2 | | O | | | O | O | 3.704 | 1.571 |
| 3 | | O | O | | O | | 2.455 | 1.509 |
| 4 | O | O | | | O | | 1.741 | 1.410 |
| 5 | O | | O | | O | | 1.248 | 1.395 |
| 6 | O | O | O | | | | 1.000 | 1.248 |
| 7 | O | | O | | | O | 0.860 | 1.163 |
| 8 | O | O | | | | O | 0.741 | 1.161 |
| 9 | O | O | | O | | | 0.625 | 1.186 |
| R | | | O | O | O | | -6.750 | |

GEAR RATIO WIDTH 9.310

| | C901 | C902 | DC | DB | B901 | B902 | GEAR RATIO | STEP RATIO |
|---|---|---|---|---|---|---|---|---|
| 1 | | | ○ | ○ | | ○ | 4.610 | |
| 2 | | | ○ | ○ | ○ | | 2.870 | 1.606 |
| 3 | ○ | | ○ | ○ | | | 1.840 | 1.560 |
| 4 | | ○ | (○) | ○ | | | 1.360 | 1.353 |
| 5 | ○ | ○ | ○ | | | | 1.000 | 1.360 |
| 6 | | ○ | ○ | | ○ | | 0.790 | 1.266 |
| 7 | | ○ | ○ | | | ○ | 0.690 | 1.145 |
| 8 | | ○ | | | ○ | ○ | 0.580 | 1.190 |
| 9 | ○ | ○ | | | | ○ | 0.460 | 1.261 |
| R | | ○ | | ○ | | ○ | -3.150 | |

GEAR RATIO WIDTH 10.02

AUTOMATIC TRANSMISSION DEVICE

TECHNICAL FIELD

The present invention relates to an automatic transmission device that changes the speed of power input to an input member to output the power to an output member.

BACKGROUND ART

Hitherto, there has been proposed an automatic transmission device capable of establishing nine forward speeds and a reverse speed with four planetary gear mechanisms, three clutches, and three brakes (see Patent Document 1, for example). The configuration of the device is illustrated in FIG. 7. As illustrated in the drawing, an automatic transmission device 901 according to a conventional example as the background art includes single-pinion first to fourth planetary gear mechanisms 910, 920, 930, and 940 each composed of a sun gear 911, 921, 931, or 941 which is an externally toothed gear, a ring gear 913, 923, 933, or 943 which is an internally toothed gear, and a carrier 912, 922, 932, and 942 that rotatably and revolvably holds a plurality of pinion gears 914, 924, 934, and 944 by coupling the pinion gears 914, 924, 934, and 944 to each other, respectively. The sun gear 911 and the sun gear 921 are coupled to each other by a first coupling element 951. The ring gear 913 and the carrier 922 are coupled to each other by a second coupling element 952. The ring gear 923, the carrier 932, and the carrier 942 are coupled to each other by a third coupling element 953. The fourth planetary gear mechanism 940 is formed on the outer peripheral side of the third planetary gear mechanism 930. The ring gear 933 and the sun gear 941 are coupled to each other by a fourth coupling element 954. The sun gear 931 is connected to an input shaft 903 via a clutch C901, and connected to a case 902 via a brake B901. The second coupling element 952 is connected to the input shaft 903 via a clutch C902. Further, the fourth coupling element 954 is connected to the input shaft 903 via a dog clutch DC. The first coupling element 951 is connected to the case 902 via a dog brake DB. The ring gear 943 of the fourth planetary gear mechanism 940 is connected to the case 902 via a brake B902. An output gear 904 is connected to the carrier 912 of the first planetary gear mechanism 910.

In the automatic transmission device 901 according to the conventional example, the gear ratios $\lambda 1, \lambda 2, \lambda 3,$ and $\lambda 4$ of the first to fourth planetary gear mechanisms 910, 920, 930, and 940 (the number of teeth of the sun gear/the number of teeth of the ring gear in each of the planetary gear mechanisms) are set to 0.36, 0.36, 0.56, and 0.66, respectively. As illustrated in the operation table of FIG. 8, a first forward speed to a ninth forward speed and a reverse speed are established, and the gear ratio width which is calculated as the gear ratio of the first forward speed (lowest speed)/the gear ratio of the ninth forward speed (highest speed) is 10.02.

With the ninth forward speed which is the highest speed established, the clutch C901, the clutch C902, and the brake B902 are engaged, and the dog clutch DC, the dog brake DB, and the brake B901 are disengaged. Thus, all (four) of the first to fourth planetary gear mechanisms 910, 920, 930, and 940 operate as a gear mechanism for torque transfer from the input shaft 903 to the output gear 904. With the eighth forward speed which is one step lower than the highest speed established, meanwhile, the clutch C902, the brake B901, and the brake B902 are engaged, and the clutch C901, the dog clutch DC, and the dog brake DB are disengaged. Thus, two of the planetary gear mechanisms, namely the first planetary gear mechanism 910 and the second planetary gear mechanism 920, operate as a gear mechanism for torque transfer from the input shaft 903 to the output gear 904.

RELATED-ART DOCUMENTS

Patent Documents

[Patent Document 1] Published Japanese Translation of PCT Application No. 2011-513662 (JP 2011-513662 A)

SUMMARY OF THE INVENTION

In such an automatic transmission device, in the case where an automatic transmission is composed of four planetary gear mechanisms and a plurality of clutches and brakes, there are a large number of manners to connect the rotary elements of the four planetary gear mechanisms and to attach the plurality of clutches and brakes, and the device can function as or cannot function as an automatic transmission device depending on the manner of connection or attachment. In addition, if the number of planetary gear mechanisms that operate for torque transfer from the input side to the output side at the highest forward speed or a shift speed that is one step lower than the highest forward speed is smaller, a loss due to meshing between gears is reduced, which enhances the torque transfer efficiency.

It is a main object of the present invention to propose a new automatic transmission device with four planetary gear mechanisms, three clutches, and three brakes. It is a further object of the present invention to improve the torque transfer efficiency.

In order to achieve at least the foregoing main object, the automatic transmission device according to the present invention adopts the following means.

The present invention provides an automatic transmission device that changes a speed of power input to an input member to output the power to an output member, characterized by including:

a first planetary gear mechanism including first to third rotary elements that form a sequence of the first rotary element, the second rotary element, and the third rotary element when arranged in an order at intervals corresponding to gear ratios in a velocity diagram;

a second planetary gear mechanism including fourth to sixth rotary elements that form a sequence of the fourth rotary element, the fifth rotary element, and the sixth rotary element when arranged in an order at intervals corresponding to gear ratios in a velocity diagram;

a third planetary gear mechanism including seventh to ninth rotary elements that form a sequence of the seventh rotary element, the eighth rotary element, and the ninth rotary element when arranged in an order at intervals corresponding to gear ratios in a velocity diagram;

a fourth planetary gear mechanism including tenth to twelfth rotary elements that form a sequence of the tenth rotary element, the eleventh rotary element, and the twelfth rotary element when arranged in an order at intervals corresponding to gear ratios in a velocity diagram;

a first coupling element that couples the third rotary element and the eighth rotary element to each other;

a second coupling element that couples the fifth rotary element and the eleventh rotary element to each other;

a third coupling element that couples the sixth rotary element and the twelfth rotary element to each other;

a fourth coupling element that couples the seventh rotary element and the tenth rotary element to each other;

a first clutch that engages and disengages the first coupling element and the third coupling element with and from each other;

a second clutch that engages and disengages the first rotary element and the third coupling element with and from each other;

a third clutch that engages and disengages the first rotary element and the fourth rotary element with and from each other;

a first brake that is disengageably engaged so as to hold the fourth rotary element stationary with respect to an automatic transmission device case;

a second brake that is disengageably engaged so as to hold the ninth rotary element stationary with respect to the automatic transmission device case; and a third brake that is disengageably engaged so as to hold the fourth coupling element stationary with respect to the automatic transmission device case, in which:

the input member is connected to the second coupling element; and the output member is connected to the second rotary element.

The automatic transmission device according to the present invention includes: the first planetary gear mechanism including as three rotary elements the first to third rotary elements which form a sequence of the first rotary element, the second rotary element, and the third rotary element when arranged in an order at intervals corresponding to gear ratios in a velocity diagram; the second planetary gear mechanism including as three rotary elements the fourth to sixth rotary elements which form a sequence of the fourth rotary element, the fifth rotary element, and the sixth rotary element when arranged in an order at intervals corresponding to gear ratios in a velocity diagram; the third planetary gear mechanism including as three rotary elements the seventh to ninth rotary elements which form a sequence of the seventh rotary element, the eighth rotary element, and the ninth rotary element when arranged in an order at intervals corresponding to gear ratios in a velocity diagram; and the fourth planetary gear mechanism including as three rotary elements the tenth to twelfth rotary elements which form a sequence of the tenth rotary element, the eleventh rotary element, and the twelfth rotary element when arranged in an order at intervals corresponding to gear ratios in a velocity diagram, and the third rotary element and the eighth rotary element are coupled to each other by the first coupling element, the fifth rotary element and the eleventh rotary element are coupled to each other by the second coupling element, the sixth rotary element and the twelfth rotary element are coupled to each other by the third coupling element, and the seventh rotary element and the tenth rotary element are coupled to each other by the fourth coupling element. Then, the first coupling element and the third coupling element are connected to each other via the first clutch, the first rotary element and the third coupling element are connected to each other via the second clutch, the first rotary element and the fourth rotary element are connected to each other via the third clutch, the first brake is connected to the fourth rotary element, the second brake is connected to the ninth rotary element, the third brake is connected to the fourth coupling element, the input member is connected to the second coupling element, and the output member is connected to the second rotary element. This makes it possible to constitute an automatic transmission device that can function with the four planetary gear mechanisms, the three clutches, and the three brakes.

In the thus configured automatic transmission device according to the present invention, a first forward speed to a ninth forward speed and a reverse speed may be established as follows:

(1) The first forward speed is established by engaging the second clutch, the first brake, and the second brake and disengaging the first clutch, the third clutch, and the third brake.

(2) The second forward speed is established by engaging the second clutch, the second brake, and the third brake and disengaging the first clutch, the third clutch, and the first brake.

(3) The third forward speed is established by engaging the second clutch, the third clutch, and the second brake and disengaging the first clutch, the first brake, and the third brake.

(4) The fourth forward speed is established by engaging the first clutch, the second clutch, and the second brake and disengaging the third clutch, the first brake, and the third brake.

(5) The fifth forward speed is established by engaging the first clutch, the third clutch, and the second brake and disengaging the second clutch, the first brake, and the third brake.

(6) The sixth forward speed is established by engaging the first clutch, the second clutch, and the third clutch and disengaging the first brake, the second brake, and the third brake.

(7) The seventh forward speed is established by engaging the first clutch, the third clutch, and the third brake and disengaging the second clutch, the first brake, and the second brake.

(8) The eighth forward speed is established by engaging the first clutch, the second clutch, and the third brake and disengaging the third clutch, the first brake, and the second brake.

(9) The ninth forward speed is established by engaging the first clutch, the second clutch, and the first brake and disengaging the third clutch, the second brake, and the third brake.

(10) The reverse speed is established by engaging the third clutch, the first brake, and the second brake and disengaging the first clutch, the second clutch, and the third brake.

Consequently, there can be provided a device capable of selectively establishing a first forward speed to a ninth forward speed and a reverse speed with the four planetary gear mechanisms, the three clutches, and the three brakes.

As discussed above, with the ninth forward speed which is the highest speed established, the first clutch, the second clutch, and the first brake are engaged, and the third clutch, the second brake, and the third brake are disengaged. The ninth rotary element of the third planetary gear mechanism is disengaged through disengagement of the second brake. Thus, the third planetary gear mechanism is not involved in torque transfer between the input member and the output member. The tenth rotary element of the fourth planetary gear mechanism is disengaged through disengagement of the third brake and disengagement of the ninth rotary element of the third planetary gear mechanism. Thus, the fourth planetary gear mechanism is also not involved in torque transfer between the input member and the output member. The first rotary element and the third rotary element of the first planetary gear mechanism are connected to each other through engagement of the first clutch and the second clutch. Thus, the first planetary gear mechanism rotates as a whole. Therefore, the first planetary gear mechanism does not operate as a gear mechanism for torque transfer between the input member and the output member. Thus, with the ninth forward speed established, only one of the planetary gear mechanisms, namely the second planetary gear mechanism, operates as a gear mechanism for torque transfer between the input member and the output member. With the eighth forward speed which is one step lower than the highest speed established, meanwhile, the first clutch, the second clutch, and the third brake are engaged, and the third clutch, the first brake, and the second brake are disengaged. The ninth rotary element of the third planetary gear mechanism is disengaged through disengagement of the second brake. Thus, the third planetary gear mechanism is not involved in torque transfer between the input member and the output member. The fourth rotary element of the second planetary gear mechanism is disengaged through disengagement of the first brake and disengagement of the third clutch. Thus, the second planetary gear mechanism is not involved in torque transfer between the input member and the output member. The first rotary element and the third rotary element of the first planetary gear mechanism are connected to each other through engagement of the first clutch and the second clutch. Thus, the first planetary gear mechanism rotates as a whole. Therefore, the first planetary gear mechanism does not operate as a gear mechanism for torque transfer between the input member and the output member. Thus, with the eighth forward speed established, only one of the planetary gear mechanisms, namely the fourth planetary gear mechanism, operates as a gear mechanism for torque transfer between the input member and the output member. As seen from the foregoing description, the number of planetary gear mechanisms that operate as a gear mechanism for torque transfer between the input member and the output member is one with any of the ninth forward speed which is the highest speed and the eighth forward speed which is one step lower than the highest speed established, and thus the number of planetary gear mechanisms that operate as a gear mechanism for torque transfer can be reduced compared to the automatic transmission device according to the conventional example, in which the number of planetary gear mechanisms that operate as a gear mechanism for torque transfer is four with the ninth forward speed which is the highest forward speed established, and two with the eighth forward speed which is one step lower than the highest speed established. This makes it possible to reduce a loss due to meshing between gears, and to enhance the torque transfer efficiency. That is, the torque transfer efficiency can be improved compared to the automatic transmission device according to the conventional example.

In the automatic transmission device according to the present invention discussed above, the first planetary gear mechanism, the second planetary gear mechanism, the third planetary gear mechanism, and the fourth planetary gear mechanism may each be constituted as a single-pinion planetary gear mechanism in which a sun gear, a ring gear, and a carrier are used as the three rotary elements; the first rotary element, the fourth rotary element, the seventh rotary element, and the tenth rotary element may each be a sun gear; the second rotary element, the fifth rotary element, the eighth rotary element, and the eleventh rotary element may each be a carrier; and the third rotary element, the sixth rotary element, the ninth rotary element, and the twelfth rotary element may each be a ring gear.

In the automatic transmission device according to the present invention, further, the second planetary gear mechanism may be provided on an outer peripheral side of the fourth planetary gear mechanism. Consequently, although the automatic transmission device is made larger in the radial direction, the automatic transmission device can be made shorter in the axial direction. That is, the automatic transmission device can have the same length in the axial direction as that of an automatic transmission device with three planetary gear mechanisms.

In the automatic transmission device according to the present invention, the planetary gear mechanisms may be disposed in an order of the first planetary gear mechanism, the second planetary gear mechanism, the fourth planetary gear mechanism, and the third planetary gear mechanism.

In the automatic transmission device according to the present invention, the second brake may be constituted as a dog brake. The dog brake tends to cause a shock during engagement, and requires synchronization control for synchronizing rotations. Because the second brake is kept engaged from the first forward speed to the fifth forward speed and kept disengaged from the sixth forward speed to the ninth forward speed, the second brake is not frequently repeatedly engaged and disengaged, and the synchronization control is less frequently performed. Therefore, degradation in shifting feeling is suppressed even if the dog brake is adopted. For the dog brake, meanwhile, it is not necessary to hold a hydraulic pressure during engagement. Therefore, it is possible to suppress an energy loss compared to a hydraulically driven brake, for which it is necessary to hold a hydraulic pressure. As a result, the energy efficiency of the device can be improved.

BRIEF DESCRIPTION OF THE DRAWINGS

FIG. 3 is an operation table of the automatic transmission device 1, 1B.

MODES FOR CARRYING OUT THE INVENTION

An embodiment of the present invention will be described below.

Figure 1:
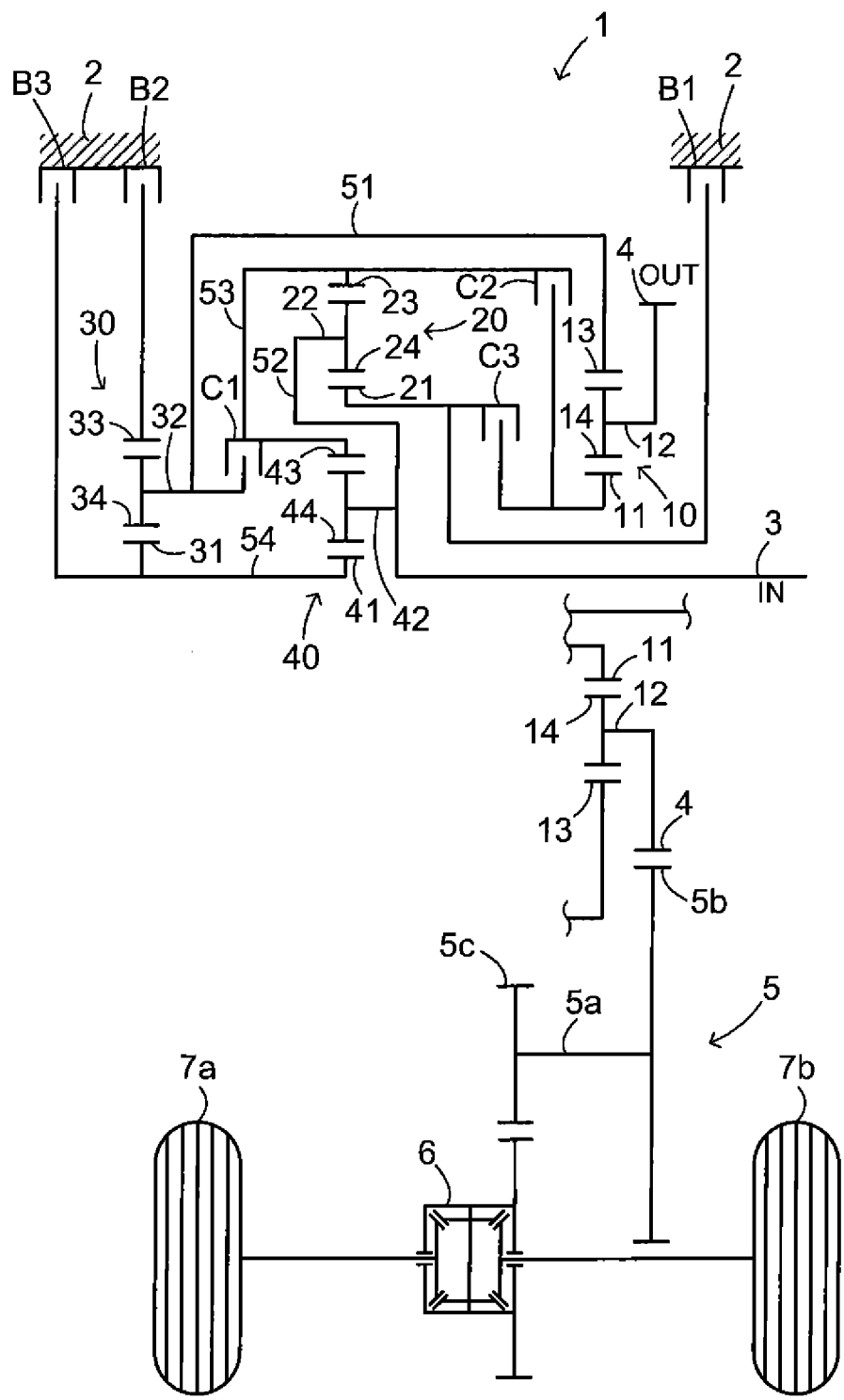
FIG. 1 is a diagram illustrating a schematic configuration of an automatic transmission device 1 according to an embodiment.
Figure 2:
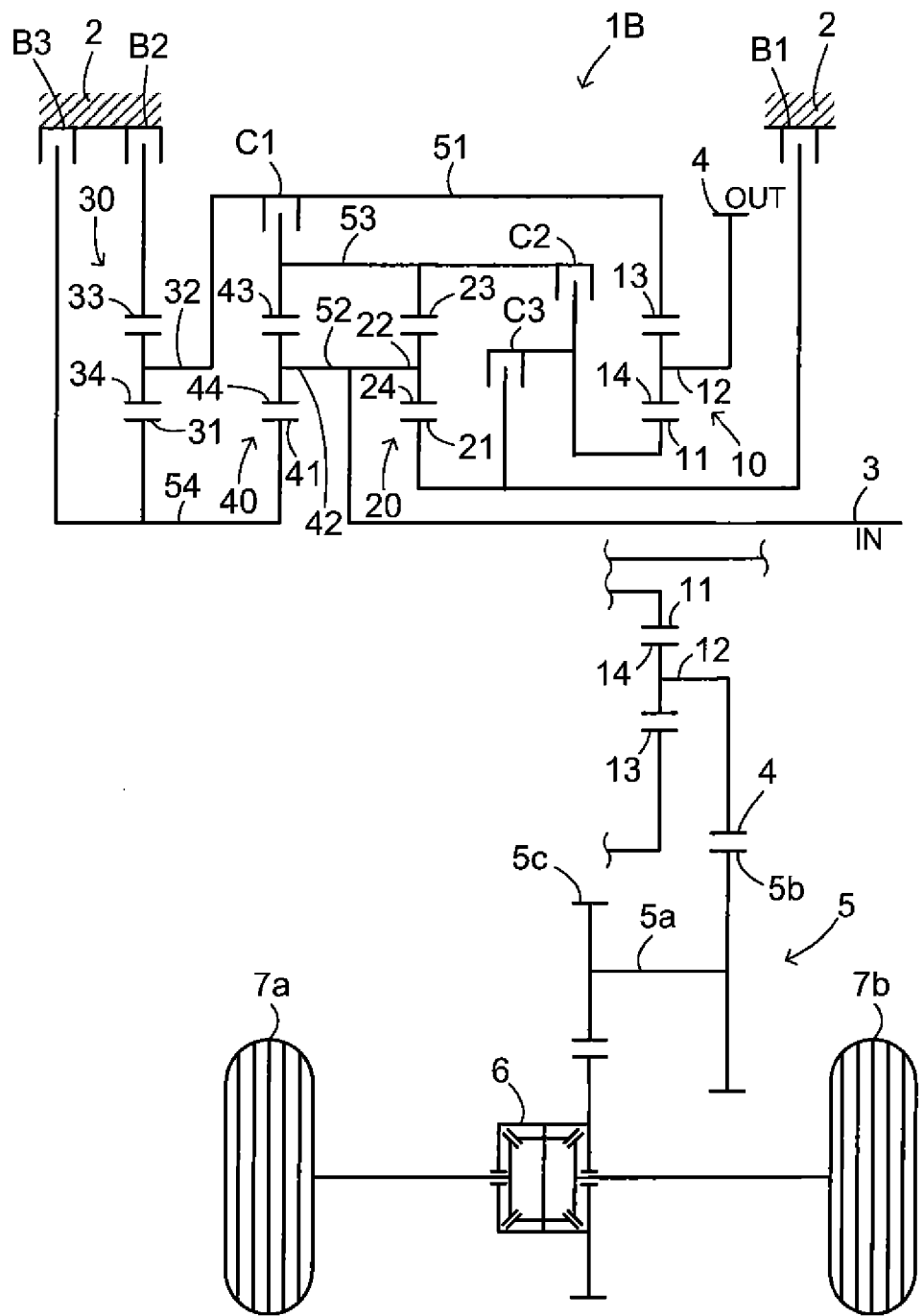
FIG. 2 is a diagram illustrating a schematic configuration of an automatic transmission device 1B according to an embodiment.

FIG. 1 is a diagram illustrating a schematic configuration of an automatic transmission device 1 according to an embodiment of the present invention. FIG. 2 is a diagram illustrating a schematic configuration of an automatic transmission device 1B according to an embodiment, in which four planetary gear mechanisms of the automatic transmission device 1 are disposed side by side. The automatic transmission device 1, 1B according to the embodiment is constituted as a stepped speed change mechanism that includes four single-pinion planetary gear mechanisms 10, 20, 30, and 40, three clutches C1 to C3, and three brakes B1 to B3, that is mounted on a vehicle of a type (for example, a front-engine front-drive type) in which an engine as an internal combustion engine (not illustrated) is disposed transversely (in the left-right direction of the vehicle), and that receives power from the engine through an input shaft 3 via a starting device such as a torque converter (not illustrated) and changes the speed of the input power to output the power to an output gear 4. The power output to the output gear 4 is output to left and right drive wheels 7a and 7b via a gear mechanism 5 and a differential gear 6. The gear mechanism 5 is constituted from a counter shaft 5a having a rotational axis disposed in parallel with the rotational axis of the output gear 4, a counter driven gear 5b attached to the counter shaft 5a and meshed with the output gear 4, and a differential drive gear 5c also attached to the counter shaft 5a and meshed with a ring gear of the differential gear 6. In the lower part of FIGS. 1 and 2 with respect to the input shaft 3, the connection between the output gear 4 and the gear mechanism 5, among components of the automatic transmission device 1, is mainly illustrated, and some of the other components are not illustrated.

Although the second planetary gear mechanism 20 is disposed on the outer peripheral side of the fourth planetary gear mechanism 40 in the automatic transmission device 1 according to the embodiment as illustrated in FIG. 1, the connection in the automatic transmission device 1 is the same as that in the automatic transmission device 1B illustrated in FIG. 2, in which the second planetary gear mechanism 20 and the fourth planetary gear mechanism 40 are disposed side by side. In the automatic transmission device 1B, as illustrated in FIG. 2, the four planetary gear mechanisms 10, 20, 30, and 40 are disposed so as to form a sequence of the first planetary gear mechanism 10, the second planetary gear mechanism 20, the fourth planetary gear mechanism 40, and the third planetary gear mechanism 30.

The first planetary gear mechanism 10 includes a sun gear 11 which is an externally toothed gear, a ring gear 13 which is an internally toothed gear disposed concentrically with the sun gear 11, a plurality of pinion gears 14 meshed with the sun gear 11 and meshed with the ring gear 13, and a carrier 12 that rotatably and revolvably holds the plurality of pinion gears 14 by coupling the pinion gears 14 to each other. The first planetary gear mechanism 10 is constituted as a single-pinion planetary gear mechanism. Thus, the three rotary elements, namely the sun gear 11, the ring gear 13, and the carrier 12, form a sequence of the sun gear 11, the carrier 12, and the ring gear 13 when arranged in the order at intervals corresponding to the gear ratios in the velocity diagram. The gear ratio $\lambda 1$ of the first planetary gear mechanism 10 (the number of teeth of the sun gear 11/the number of teeth of the ring gear 13) is set to 0.25, for example.

The second planetary gear mechanism 20 includes a sun gear 21 which is an externally toothed gear, a ring gear 23 which is an internally toothed gear disposed concentrically with the sun gear 21, a plurality of pinion gears 24 meshed with the sun gear 21 and meshed with the ring gear 23, and a carrier 22 that rotatably and revolvably holds the plurality of pinion gears 24 by coupling the pinion gears 24 to each other. The second planetary gear mechanism 20 is constituted as a single-pinion planetary gear mechanism. Thus, the three rotary elements, namely the sun gear 21, the ring gear 23, and the carrier 22, form a sequence of the sun gear 21, the carrier 22, and the ring gear 23 when arranged in the order at intervals corresponding to the gear ratios in the velocity diagram. The gear ratio $\lambda 2$ of the second planetary gear mechanism 20 (the number of teeth of the sun gear 21/the number of teeth of the ring gear 23) is set to 0.60, for example.

The third planetary gear mechanism 30 includes a sun gear 31 which is an externally toothed gear, a ring gear 33 which is an internally toothed gear disposed concentrically with the sun gear 31, a plurality of pinion gears 34 meshed with the sun gear 31 and meshed with the ring gear 33, and a carrier 32 that rotatably and revolvably holds the plurality of pinion gears 34 by coupling the pinion gears 34 to each other. The third planetary gear mechanism 30 is constituted as a single-pinion planetary gear mechanism. Thus, the three rotary elements, namely the sun gear 31, the ring gear 33, and the carrier 32, form a sequence of the sun gear 31, the carrier 32, and the ring gear 33 when arranged in the order at intervals corresponding to the gear ratios in the velocity diagram. The gear ratio $\lambda 3$ of the third planetary gear mechanism 30 (the number of teeth of the sun gear 31/the number of teeth of the ring gear 33) is set to 0.35, for example.

The fourth planetary gear mechanism 40 includes a sun gear 41 which is an externally toothed gear, a ring gear 43 which is an internally toothed gear disposed concentrically with the sun gear 41, a plurality of pinion gears 44 meshed with the sun gear 41 and meshed with the ring gear 43, and a carrier 42 that rotatably and revolvably holds the plurality of pinion gears 44 by coupling the pinion gears 44 to each other. The fourth planetary gear mechanism 40 is constituted as a single-pinion planetary gear mechanism. Thus, the three rotary elements, namely the sun gear 41, the ring gear 43, and the carrier 42, form a sequence of the sun gear 41, the carrier 42, and the ring gear 43 when arranged in the order at intervals corresponding to the gear ratios in the velocity diagram. The gear ratio $\lambda 4$ of the fourth planetary gear mechanism 40 (the number of teeth of the sun gear 41/the number of teeth of the ring gear 43) is set to 0.35, for example.

The ring gear 13 of the first planetary gear mechanism 10 is coupled to the carrier 32 of the third planetary gear mechanism 30 by a first coupling element 51. The carrier 22 of the second planetary gear mechanism 20 is coupled to the carrier 42 of the fourth planetary gear mechanism 40 by a second coupling element 52. In addition, the ring gear 23 of the second planetary gear mechanism 20 is coupled to the ring gear 43 of the fourth planetary gear mechanism 40 by a third coupling element 53. The sun gear 31 of the third planetary gear mechanism 30 is coupled to the sun gear 41 of the fourth planetary gear mechanism 40 by a fourth coupling element 54.

The first coupling element 51 (the ring gear 13, the carrier 32) is connected to the third coupling element 53 (the ring gear 23, the ring gear 43) via the clutch C1. The sun gear 11 of the first planetary gear mechanism 10 is connected to the third coupling element 53 (the ring gear 23, the ring gear 43) via the clutch C2. In addition, the sun gear 11 of the first planetary gear mechanism 10 is connected to the sun gear 21 of the second planetary gear mechanism 20 via the clutch C3. The sun gear 21 of the second planetary gear mechanism 20 is connected to a case (automatic transmission device case) 2 via the brake B1. The ring gear 33 of the third planetary gear mechanism 30 is connected to the case 2 via the brake B2. In addition, the fourth coupling element 54 (the sun gear 31, the sun gear 41) is connected to the case 2 via the brake B3. The input shaft 3 is connected to the second coupling element 52 (the carrier 22, the carrier 42). The output gear 4 is connected to the carrier 12 of the first planetary gear mechanism 10. Here, in the embodiment, the three clutches C-1 to C-3 and the three brakes B-1 to B-3 are constituted as hydraulically driven friction clutches and friction brakes that are engaged by pressing friction plates using a piston.

Figure 4:
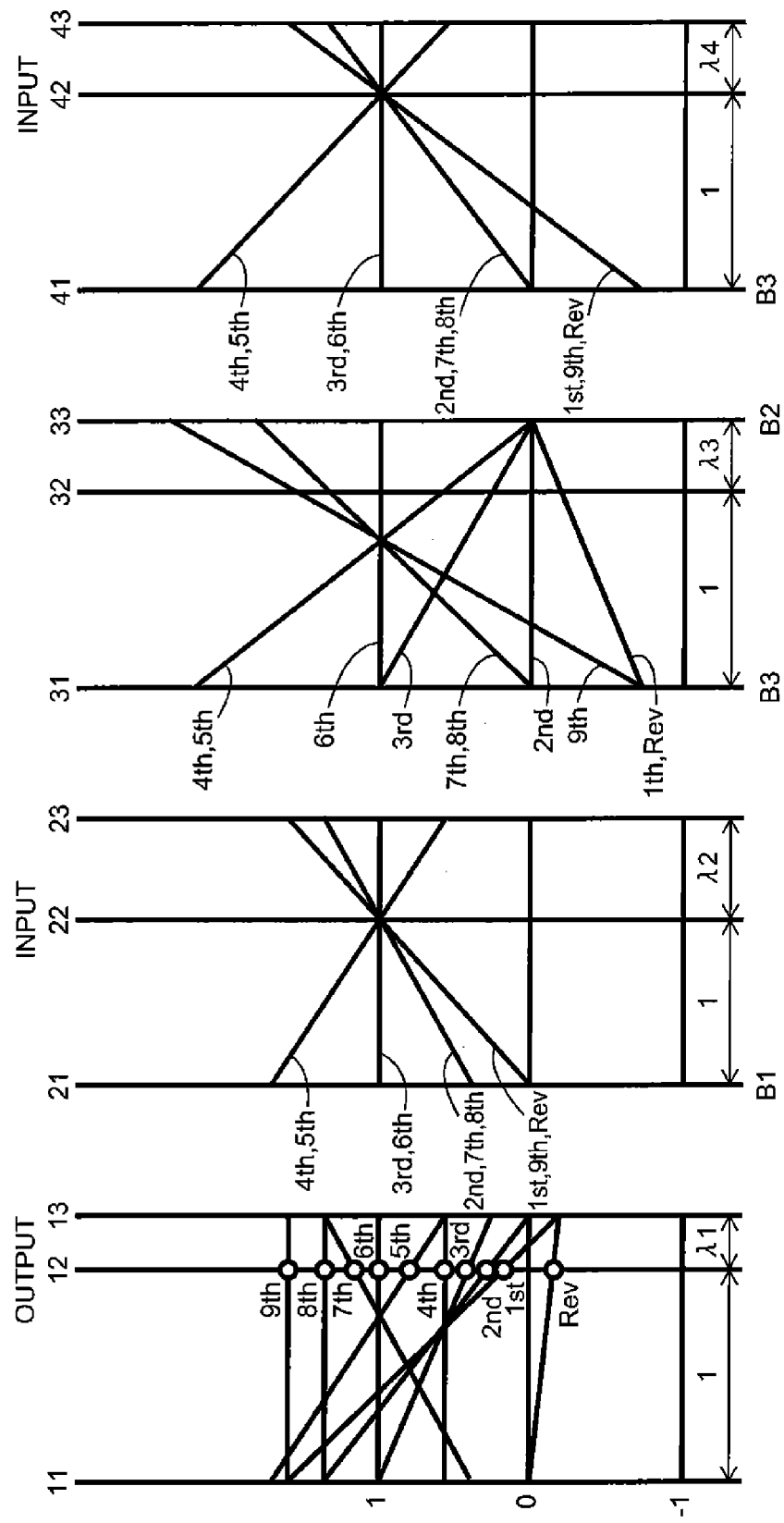
FIG. 4 is a velocity diagram of the automatic transmission device 1, 1B.

The thus configured automatic transmission device 1, 1B according to the embodiment can switchably establish a first forward speed to a ninth forward speed and a reverse speed by engaging and disengaging the three clutches C1 to C3 and engaging and disengaging the three brakes B1 to B3 in combination. FIG. 3 is an operation table of the automatic transmission device 1, 1B. FIG. 4 includes velocity diagrams of the first to fourth planetary gear mechanisms 10, 20, 30, and 40 of the automatic transmission device 1, 1B. In FIG. 4, the velocity diagram of the first planetary gear mechanism 10, the velocity diagram of the second planetary gear mechanism 20, the velocity diagram of the third planetary gear mechanism 30, and the velocity diagram of the fourth planetary gear mechanism 40 are arranged in this order from the left. In each of the velocity diagrams, the sun gear, the carrier, and the ring gear are arranged in this order from the left. In FIG. 4, in addition, "1st" indicates the first forward speed, "2nd" indicates the second forward speed, "3rd" indicates the third forward speed, "4th" to "9th" indicate the fourth forward speed to the ninth forward speed, and "Rev" indicates the reverse speed. "λ1" to "λ4" indicate the respective gear ratios of the planetary gear mechanisms. "B1", "B2", and "B3" indicate the brakes B1 to B3. "INPUT" indicates the position of connection of the input shaft 3. "OUTPUT" indicates the position of connection of the output gear 4.

In the automatic transmission device 1, 1B according to the embodiment, as illustrated in FIG. 3, the first forward speed to the ninth forward speed and the reverse speed are established as follows. For the gear ratio (the rotational speed of the input shaft 3/the rotational speed of the output gear 4), the gear ratios λ1, λ2, λ3, and λ4 of the first to fourth planetary gear mechanisms 10, 20, 30, and 40 are set to 0.25, 0.60, 0.35, and 0.35, respectively.

(1) The first forward speed can be established by engaging the clutch C2, the brake B1, and the brake B2 and disengaging the clutch C1, the clutch C3, and the brake B3, and has a gear ratio of 5.819. With the first forward speed established, all of the first to fourth planetary gear mechanisms 10, 20, 30, and 40 operate as a gear mechanism for torque transfer between the input shaft 3 and the output gear 4.

(2) The second forward speed can be established by engaging the clutch C2, the brake B2, and the brake B3 and disengaging the clutch C1, the clutch C3, and the brake B1, and has a gear ratio of 3.704. With the second forward speed established, the brake B2 and the brake B3 are engaged, and thus the ring gear 33 and the sun gear 31 of the third planetary gear mechanism 30 are unrotatably stationary. Therefore, the third planetary gear mechanism 30 is unrotatable. The clutch C3 and the brake B1 are disengaged, and thus the sun gear 21 of the second planetary gear mechanism 20 is disengaged. Therefore, the second planetary gear mechanism 20 is not involved in torque transfer between the input shaft 3 and the output gear 4. Thus, two of the planetary gear mechanisms, namely the first planetary gear mechanism 10 and the fourth planetary gear mechanism 40, operate as a gear mechanism for torque transfer between the input shaft 3 and the output gear 4.

(3) The third forward speed can be established by engaging the clutch C, the clutch C3, and the brake B2 and disengaging the clutch C1, the brake B1, and the brake B3, and has a gear ratio of 2.455. With the third forward speed established, the clutch C2 and the clutch C3 are engaged, and thus the sun gear 21 and the ring gear 23 of the second planetary gear mechanism 20 are connected to each other. Therefore, the second planetary gear mechanism 20 rotates as a whole, and the second planetary gear mechanism 20 does not operate as a gear mechanism for torque transfer between the input shaft 3 and the output gear 4. At this time, the carrier 22 of the second planetary gear mechanism 20 is in the same state as being connected to the sun gear 21 and the ring gear 23, and thus the carrier 42 of the fourth planetary gear mechanism 40 is connected to the ring gear 43 via the second coupling element 52, the carrier 22, the ring gear 23, and the third coupling element 53. Therefore, the fourth planetary gear mechanism 40 also rotates as a whole, and the fourth planetary gear mechanism 40 does not operate as a gear mechanism for torque transfer between the input shaft 3 and the output gear 4. Thus, two of the planetary gear mechanisms, namely the first planetary gear mechanism 10 and the third planetary gear mechanism 30, operate as a gear mechanism for torque transfer between the input shaft 3 and the output gear 4.

(4) The fourth forward speed can be established by engaging the clutch C1, the clutch C2, and the brake B2 and disengaging the clutch C3, the brake B1, and the brake B3, and has a gear ratio of 1.741. With the fourth forward speed established, the clutch C1 and the clutch C2 are engaged, and thus the sun gear 11 and the ring gear 13 of the first planetary gear mechanism 10 are connected to each other. Therefore, the first planetary gear mechanism 10 rotates as a whole, and the first planetary gear mechanism 10 does not operate as a gear mechanism for torque transfer between the input shaft 3 and the output gear 4. The clutch C3 and the brake B1 are disengaged, and thus the sun gear 21 of the second planetary gear mechanism 20 is disengaged. Therefore, the second planetary gear mechanism 20 is not involved in torque transfer between the input shaft 3 and the output gear 4. Thus, two of the planetary gear mechanisms, namely the third planetary gear mechanism 30 and the fourth planetary gear mechanism 40, operate as a gear mechanism for torque transfer between the input shaft 3 and the output gear 4.

(5) The fifth forward speed can be established by engaging the clutch C1, the clutch C3, and the brake B2 and disengaging the clutch C2, the brake B1, and the brake B3, and has a gear ratio of 1.248. With the fifth forward speed established, all of the first to fourth planetary gear mechanisms 10, 20, 30, and 40 operate as a gear mechanism for torque transfer between the input shaft 3 and the output gear 4.

(6) The sixth forward speed can be established by engaging the clutch C1, the clutch C2, and the clutch C3 and disengaging the brake B1, the brake B2, and the brake B3, and has a gear ratio of 1.000. With the sixth forward speed established, the clutch C1 and the clutch C2 are engaged, and thus the sun gear 11 and the ring gear 13 of the first planetary gear mechanism 10 are connected to each other. Therefore, the first planetary gear mechanism 10 rotates as a whole, and the first planetary gear mechanism 10 does not operate as a gear mechanism for torque transfer between the input shaft 3 and the output gear 4. The clutch C2 and the clutch C1 are engaged, and thus the sun gear 21 and the ring gear 23 of the second planetary gear mechanism 20 are connected to each other. Therefore, the second planetary gear mechanism 20 rotates as a whole, and the second planetary gear mechanism 20 does not operate as a gear mechanism for torque transfer between the input shaft 3 and the output gear 4. The brake B2 is disengaged, and thus the ring gear 33 of the third planetary gear mechanism 30 is disengaged. Therefore, the third planetary gear mechanism 30 is not involved in torque transfer between the input shaft 3 and the output gear 4. The brake B2 and the brake B3 are disengaged, and thus the sun gear 41 of the fourth planetary gear mechanism 40 is disengaged. Therefore, the fourth planetary gear mechanism 40 is not involved in torque transfer between the input shaft 3 and the output gear 4. Thus, none of the first to fourth planetary gear mechanisms 10, 20, 30, and 40 operates as a gear mechanism for torque transfer between the input shaft 3 and the output gear 4.

(7) The seventh forward speed can be established by engaging the clutch C1, the clutch C3, and the brake B3 and disengaging the clutch C2, the brake B1, and the brake B2, and has a gear ratio of 0.860. With the seventh forward speed established, the brake B2 is disengaged, and thus the ring gear 33 of the third planetary gear mechanism 30 is disengaged. Therefore, the third planetary gear mechanism 30 is not involved in torque transfer between the input shaft 3 and the output gear 4. Thus, three of the planetary gear mechanisms, namely the first planetary gear mechanism 10, the second planetary gear mechanism 20, and the fourth planetary gear mechanism 40, operate as a gear mechanism for torque transfer between the input shaft 3 and the output gear 4.

(8) The eighth forward speed can be established by engaging the clutch C1, the clutch C2, and the brake B3 and disengaging the clutch C3, the brake B1, and the brake B2, and has a gear ratio of 0.741. With the eighth forward speed established, the clutch C1 and the clutch C2 are engaged, and thus the sun gear 11 and the ring gear 13 of the first planetary gear mechanism 10 are connected to each other. Therefore, the first planetary gear mechanism 10 rotates as a whole, and the first planetary gear mechanism 10 does not operate as a gear mechanism for torque transfer between the input shaft 3 and the output gear 4. The brake B2 is disengaged, and thus the ring gear 33 of the third planetary gear mechanism 30 is disengaged. Therefore, the third planetary gear mechanism 30 is not involved in torque transfer between the input shaft 3 and the output gear 4. The clutch C3 and the brake B1 are disengaged, and thus the sun gear 21 of the second planetary gear mechanism 20 is disengaged. Therefore, the second planetary gear mechanism 20 is not involved in torque transfer between the input shaft 3 and the output gear 4. Thus, only one of the planetary gear mechanisms, namely the fourth planetary gear mechanism 40, operates as a gear mechanism for torque transfer between the input shaft 3 and the output gear 4.

(9) The ninth forward speed can be established by engaging the clutch C1, the clutch C2, and the brake B1 and disengaging the clutch C3, the brake B2, and the brake B3, and has a gear ratio of 0.625. Here, the clutch C1 and the clutch C2 are engaged, and thus the sun gear 11 and the ring gear 13 of the first planetary gear mechanism 10 are connected to each other. Therefore, the first planetary gear mechanism 10 rotates as a whole, and the first planetary gear mechanism 10 does not operate as a gear mechanism for torque transfer between the input shaft 3 and the output gear 4. The brake B2 is disengaged, and thus the ring gear 33 of the third planetary gear mechanism 30 is disengaged. Therefore, the third planetary gear mechanism 30 is not involved in torque transfer between the input shaft 3 and the output gear 4. The brake B2 and the brake B3 are disengaged, and thus the sun gear 41 of the fourth planetary gear mechanism 40 is disengaged. Therefore, the third planetary gear mechanism 30 is not involved in torque transfer between the input shaft 3 and the output gear 4. Thus, only one of the planetary gear mechanisms, namely the second planetary gear mechanism 20, operates as a gear mechanism for torque transfer between the input shaft 3 and the output gear 4.

(10) The reverse speed can be established by engaging the clutch C3, the brake B1, and the brake B2 and disengaging the clutch C1, the clutch C2, and the brake B3, and has a gear ratio of −6.750.

As discussed above, in the automatic transmission device 1, 1B according to the embodiment, with the ninth forward speed which is the highest speed established, only one of the planetary gear mechanisms, namely the second planetary gear mechanism 20, operates as a gear mechanism for torque transfer between the input shaft 3 and the output gear 4. In the automatic transmission device 901 according to the conventional example illustrated in FIG. 7, on the other hand, with the ninth forward speed which is the highest speed established, all (four) of the first to fourth planetary gear mechanisms 910, 920, 930, and 940 operate for torque transfer between the input shaft 903 and the output gear 904. Thus, in the automatic transmission device 1, 1B according to the embodiment, the number of planetary gear mechanisms that operate for torque transfer with the highest speed established is reduced compared to the automatic transmission device 901 according to the conventional example. As a result, with the automatic transmission device 1, 1B according to the embodiment, it is possible to reduce a loss due to meshing between gears and enhance the torque transfer efficiency compared to the automatic transmission device 901 according to the conventional example. In addition, in the automatic transmission device 1, 1B according to the embodiment, with the eighth forward speed which is one step lower than the highest speed established, only one of the planetary gear mechanisms, namely the fourth planetary gear mechanism 40, operates as a gear mechanism for torque transfer between the input shaft 3 and the output gear 4. In the automatic transmission device 901 according to the conventional example illustrated in FIG. 7, on the other hand, with the eighth forward speed which is one step lower than the highest speed established, two of the planetary gear mechanisms, namely the first planetary gear mechanism 910 and the second planetary gear mechanism 920, operate for torque transfer between the input shaft 903 and the output gear 904. Thus, in the automatic transmission device 1, 1B according to the embodiment, the number of planetary gear mechanisms that operate for torque transfer with the highest speed established is reduced compared to the automatic transmission device 901 according to the conventional example. As a result, with the automatic transmission device 1, 1B according to the embodiment, it is possible to reduce a loss due to meshing between gears and enhance the torque transfer efficiency compared to the automatic transmission device 901 according to the conventional example. Thus, because the highest speed and a shift speed that is one step lower than the highest speed are used for travel at a relatively high speed, for example cruising on a highway, in the case where the automatic transmission device 1, 1B is mounted on a vehicle, it is possible to enhance the torque transfer efficiency during travel at a relatively high speed, and to improve the fuel efficiency of the vehicle.

Figures 7, 8:
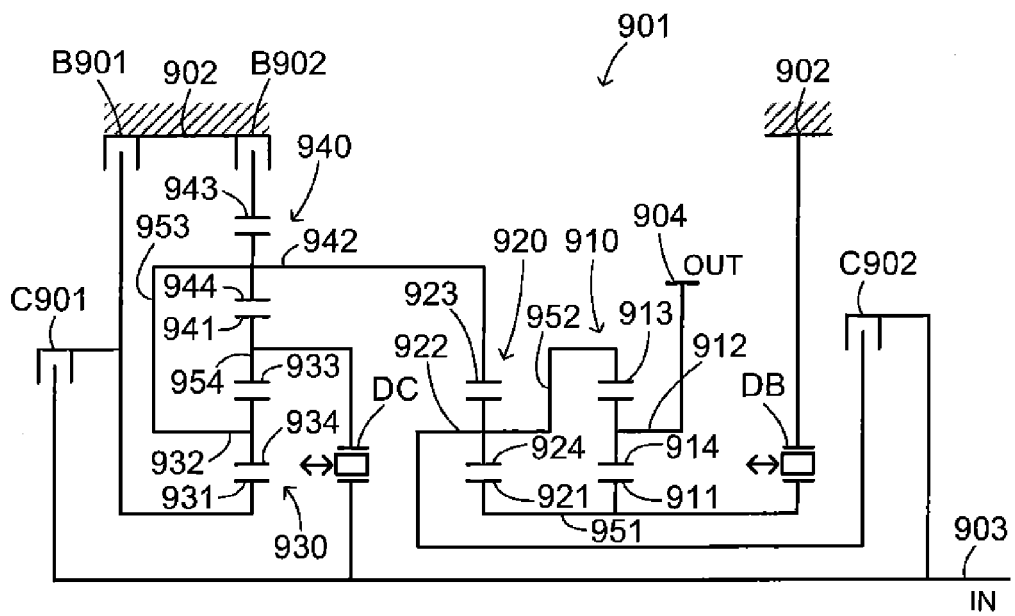
FIG. 7 is a diagram illustrating a schematic configuration of an automatic transmission device 901 according to a conventional example.
FIG. 8 is an operation table of the automatic transmission device 901 according to the conventional example.

The rotational speeds of the rotary elements constituting the planetary gear mechanisms of the automatic transmission device 1, 1B according to the embodiment in which the gear ratios $\lambda 1$, $\lambda 2$, $\lambda 3$, and $\lambda 4$ of the first to fourth planetary gear mechanisms 10, 20, 30, and 40 are set to 0.25, 0.60, 0.35, and 0.35, respectively, and of the automatic transmission device 901 according to the conventional example illustrated in FIG. 7 will be discussed below.

(1) For the automatic transmission device 1, 1B according to the embodiment, the highest one of the rotational speeds of the three rotary elements (the sun gear 11, 21, 31, or 41, the carrier 12, 22, 32, or 42, and the ring gear 13, 23, 33, or 43) constituting the first to fourth planetary gear mechanisms 10, 20, 30, and 40 is about 4.4 times the rotational speed of the input shaft 3. For the automatic transmission device 901 according to the conventional example, however, the highest one of the rotational speeds is about 5.5 times the rotational speed of the input shaft 903. Thus, with the automatic transmission device 1, 1B according to the embodiment, it is possible to reduce the highest one of the rotational speeds of the rotary elements compared to the automatic transmission device 901 according to the conventional example. As a result, the automatic transmission device 1, 1B according to the embodiment can improve the durability of the device and suppress a cost required for heat treatment or surface treatment for ensuring durability compared to the automatic transmission device 901 according to the conventional example.

(2) For the automatic transmission device 1, 1B according to the embodiment, the highest one of the rotational speeds of the pinion gears 14, 24, 34, and 44 of the first to fourth planetary gear mechanisms 10, 20, 30, and 40 is about 1.8 times the rotational speed of the input shaft 3 with the eighth forward speed established, about 3.0 times the rotational speed of the input shaft 3 with the ninth forward speed established, and about 3.0 times the rotational speed of the input shaft 3 with the reverse speed established. For the automatic transmission device 901 according to the conventional example, however, the highest one of the rotational speeds of the pinion gears is about 3.0 times the rotational speed of the input shaft 903 with the eighth forward speed established, about 4.8 times the rotational speed of the input shaft 903 with the ninth forward speed established, and about 4.0 times the rotational speed of the input shaft 903 with the reverse speed established. Thus, with the automatic transmission device 1, 1B according to the embodiment, it is possible to reduce the highest one of the rotational speeds of the pinion gears with any of the eighth forward speed, the ninth forward speed, and the reverse speed established compared to the automatic transmission device 901 according to the conventional example. As a result, the automatic transmission device 1, 1B according to the embodiment can improve the durability of the device and suppress a cost required for heat treatment or surface treatment for ensuring durability compared to the automatic transmission device 901 according to the conventional example.

(3) For the automatic transmission device 1, 1B according to the embodiment, the relative rotational speed of the engagement elements (the clutches C1 to C3 and the brakes B1 to B3) is 1.8 times the rotational speed of the input shaft 3 with the seventh forward speed established, 1.8 times the rotational speed of the input shaft 3 with the eighth forward speed established, and 2.4 times the rotational speed of the input shaft 3 with the ninth forward speed established. For the automatic transmission device 901 according to the conventional example, however, the relative rotational speed of the engagement elements is 2.7 times the rotational speed of the input shaft 903 with the seventh forward speed established, 3.8 times the rotational speed of the input shaft 903 with the eighth forward speed established, and 5.5 times the rotational speed of the input shaft 903 with the ninth forward speed established. Thus, with the automatic transmission device 1, 1B according to the embodiment, it is possible to reduce the relative rotational speed of the engagement elements with any of the seventh forward speed, the eighth forward speed, and the ninth forward speed established compared to the automatic transmission device 901 according to the conventional example. As a result, wet multi-plate clutches and wet multi-plate brakes which are normally used as engagement elements can be used for the automatic transmission device 1, 1B according to the embodiment, and it is possible to obtain good controllability during shifting and reduce a shock during shifting compared to the automatic transmission device 901 according to the conventional example which uses dog clutches and dog brakes.

With the automatic transmission device 1, 1B according to the embodiment described above, there can be provided an automatic transmission device including the single-pinion first to fourth planetary gear mechanisms 10, 20, 30, and 40, the three clutches C1 to C3, and the three brakes B1 to B3 and capable of selectively establishing the first forward speed to the ninth forward speed and the reverse speed, in which: the ring gear 13 of the first planetary gear mechanism 10 is coupled to the carrier 32 of the third planetary gear mechanism 30 by the first coupling element 51; the carrier 22 of the second planetary gear mechanism 20 is coupled to the carrier 42 of the fourth planetary gear mechanism 40 by the second coupling element 52; the ring gear 23 of the second planetary gear mechanism 20 is coupled to the ring gear 43 of the fourth planetary gear mechanism 40 by the third coupling element 53; the sun gear 31 of the third planetary gear mechanism 30 is coupled to the sun gear 41 of the fourth planetary gear mechanism 40 by the fourth coupling element 54; the first coupling element 51 (the ring gear 13, the carrier 32) is connected to the third coupling element 53 (the ring gear 23, the ring gear 43) via the clutch C1; the sun gear 11 of the first planetary gear mechanism 10 is connected to the third coupling element 53 (the ring gear 23, the ring gear 43) via the clutch C2; the sun gear 11 of the first planetary gear mechanism 10 is connected to the sun gear 21 of the second planetary gear mechanism 20 via the clutch C3; the sun gear 21 of the second planetary gear mechanism 20 is connected to the case 2 via the brake B1; the ring gear 33 of the third planetary gear mechanism 30 is connected to the case 2 via the brake B2; the fourth coupling element 54 (the sun gear 31, the sun gear 41) is connected to the case 2 via the brake B3; the second coupling element 52 (the carrier 22, the carrier 42) is connected to the input shaft 3; and the carrier 12 of the first planetary gear mechanism 10 is connected to the output gear 4.

In the automatic transmission device 1, 1B according to the embodiment, the ninth forward speed which is the highest speed is established by engaging the clutch C1, the clutch C2, and the brake B1 and disengaging the clutch C3, the brake B2, and the brake B3. Thus, only one of the planetary gear mechanisms, namely the second planetary gear mechanism 20, operates as a gear for torque transfer between the input shaft 3 and the output gear 4, and the number of planetary gear mechanisms that operate for torque transfer with the highest speed established can be reduced compared to the automatic transmission device 901 according to the conventional example, in which with the ninth forward speed which is the highest speed established, all (four) of the first to fourth planetary gear mechanisms 910, 920, 930, and 940 operate for torque transfer between the input shaft 903 and the output gear 904. This makes it possible to reduce a loss due to meshing between gears, and to enhance the torque transfer efficiency. In the automatic transmission device 1, 1B according to the embodiment, in addition, the eighth forward speed which is one step lower than the highest speed is established by engaging the clutch C1, the clutch C2, and the brake B3 and disengaging the clutch C3, the brake B1, and the brake B2. Thus, only one of the planetary gear mechanisms, namely the fourth planetary gear mechanism 40, operates as a gear for torque transfer between the input shaft 3 and the output gear 4, and the number of planetary gear mechanisms that operate for torque transfer with a shift speed that is one step lower than the highest speed established can be reduced compared to the automatic transmission device 901 according to the conventional example, in which with the eighth forward speed which is one step lower than the highest speed established, two of the planetary gear mechanisms, namely the first planetary gear mechanism 910 and the second planetary gear mechanism 920, operate for torque transfer between the input shaft 903 and the output gear 904. This makes it possible to reduce a loss due to meshing between gears, and to enhance the torque transfer efficiency. As a result, the torque transfer efficiency of the automatic transmission device can be improved.

In the automatic transmission device 1 according to the embodiment, the second planetary gear mechanism 20 is disposed on the outer peripheral side of the fourth planetary gear mechanism 40. Thus, although the automatic transmission device 1 is made larger in the radial direction, the automatic transmission device 1 can be made shorter in the axial direction than an automatic transmission device in which four planetary gear mechanisms are disposed side by side. That is, the automatic transmission device 1 has the same length in the axial direction as that of an automatic transmission device in which three planetary gear mechanisms are disposed side by side.

In the automatic transmission device 1, 1B according to the embodiment, the highest one of the rotational speeds of the three rotary elements constituting the first to fourth planetary gear mechanisms 10, 20, 30, and 40 is low compared to the automatic transmission device 901 according to the conventional example. Thus, it is possible to improve the durability of the device and suppress a cost required for heat treatment or surface treatment for ensuring durability compared to the automatic transmission device 901 according to the conventional example. In the automatic transmission device 1, 1B according to the embodiment, in addition, the highest one of the rotational speeds of the pinion gears 14, 24, 34, and 44 of the first to fourth planetary gear mechanisms 10, 20, 30, and 40 is low with any of the eighth forward speed, the ninth forward speed, and the reverse speed established compared to the automatic transmission device 901 according to the conventional example. Thus, it is possible to improve the durability of the device and suppress a cost required for heat treatment or surface treatment for ensuring durability. In the automatic transmission device 1, 1B according to the embodiment, further, the relative rotational speed of the engagement elements with any of the seventh forward speed, the eighth forward speed, and the ninth forward speed established is low compared to the automatic transmission device 901 according to the conventional example. Thus, wet multi-plate clutches and wet multi-plate brakes which are normally used as engagement elements can be used to obtain good controllability during shifting and reduce a shock during shifting compared to the automatic transmission device 901 according to the conventional example.

Figure 5:
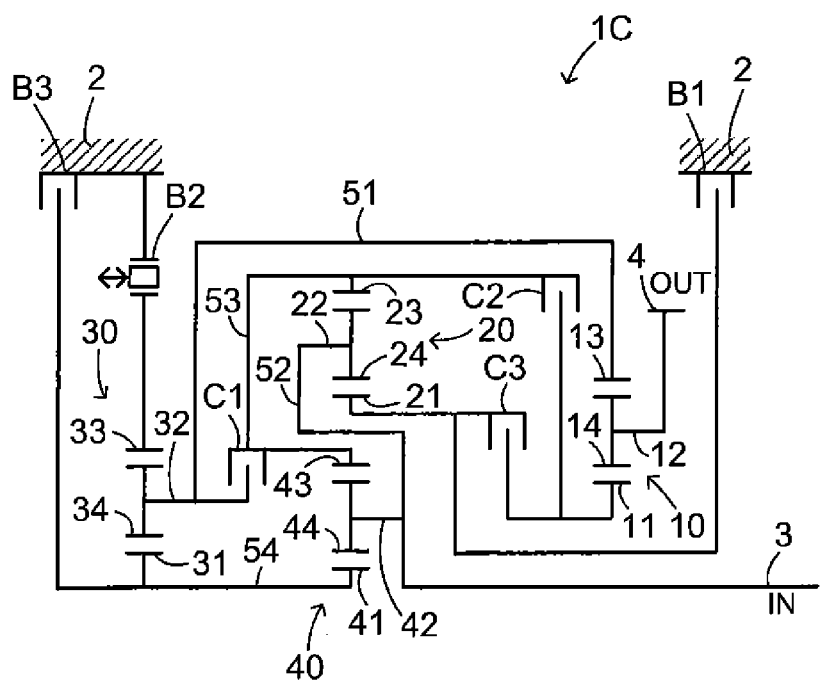
FIG. 5 is a diagram illustrating a schematic configuration of an automatic transmission device 1C according to a modification.
Figure 6:
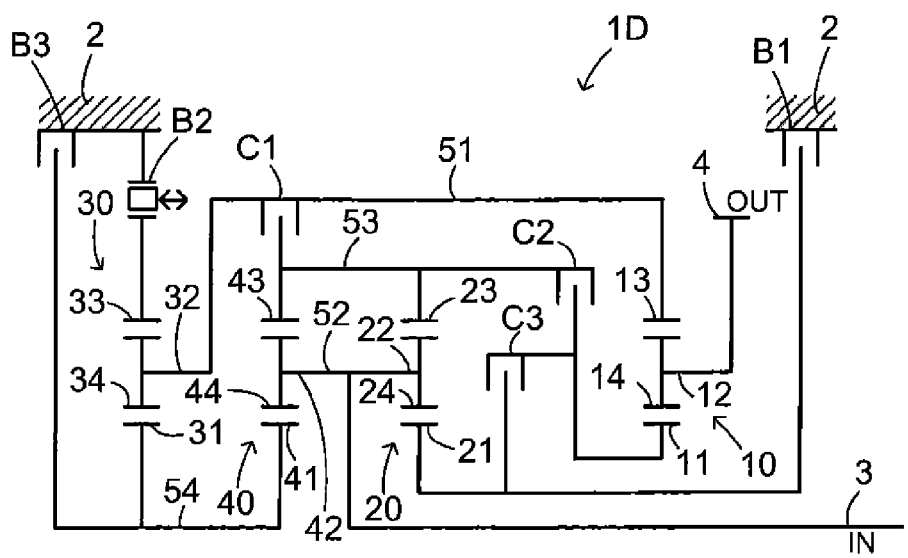
FIG. 6 is a diagram illustrating a schematic configuration of an automatic transmission device 1D according to a modification.

In the automatic transmission device 1, 1B according to the embodiment, all of the three clutches C1 to C3 are constituted as friction clutches, and all of the three brakes B1 to B3 are constituted as friction brakes. However, some of the clutches and the brakes may be constituted as dog clutches and dog brakes rather than the friction clutches and the friction brakes. Automatic transmission devices 1C and 1D according to a modification of the automatic transmission devices 1 and 1B, in which the brake B2 is constituted as a dog brake, are illustrated in FIGS. 5 and 6, respectively. The operation table and the velocity diagram of the automatic transmission device 1C, 1D according to the modification are the same as those in FIGS. 3 and 4. The dog brake tends to cause a shock during engagement, and requires synchronization control for synchronizing rotations. Because the brake B2 is kept engaged from the first forward speed to the fifth forward speed and kept disengaged from the sixth forward speed to the ninth forward speed, the brake B2 is not frequently repeatedly engaged and disengaged, and the synchronization control is less frequently performed. Therefore, degradation in shifting feeling is suppressed even if the dog brake is adopted. For the dog brake, meanwhile, it is not necessary to hold a hydraulic pressure during engagement. Therefore, it is possible to suppress an energy loss compared to a hydraulically driven brake, for which it is necessary to hold a hydraulic pressure. As a result, the energy efficiency of the device can be improved.

In the automatic transmission device 1, 1B according to the embodiment, the gear ratios $\lambda 1, \lambda 2, \lambda 3$, and $\lambda 4$ of the first to fourth planetary gear mechanisms 10, 20, 30, and 40 are set to 0.25, 0.60, 0.35, and 0.35, respectively. However, the gear ratios $\lambda 1, \lambda 2, \lambda 3$, and $\lambda 4$ are not limited to such values.

In the automatic transmission device 1, 1B according to the embodiment, all of the first to fourth planetary gear mechanisms 10, 20, 30, and 40 are constituted as single-pinion planetary gear mechanisms. However, some or all of the first to fourth planetary gear mechanisms 10, 20, 30, and 40 may be constituted as double-pinion planetary gear mechanisms.

The automatic transmission device 1, 1B according to the embodiment is an automatic transmission device capable of establishing the first forward speed to the ninth forward speed and the reverse speed by engaging three of the three clutches C1 to C3 and the three brakes B1 to B3 and disengaging the other three. However, the automatic transmission device 1, 1B may be an automatic transmission device capable of establishing eight speeds excluding one speed from the nine speeds from the first forward speed to the ninth forward speed, or seven speeds or less excluding a plurality of speeds from the nine speeds, and the reverse speed.

Here, the correspondence between the main elements of the embodiment and the main elements of the invention described in the "SUMMARY OF THE INVENTION" section will be described. In the embodiment, the input shaft 3 corresponds to the "input member". The output gear 4 corresponds to the "output member". The first planetary gear mechanism 10 corresponds to the "first planetary gear mechanism". The sun gear 11 corresponds to the "first rotary element". The carrier 12 corresponds to the "second rotary element". The ring gear 13 corresponds to the "third rotary element". The second planetary gear mechanism 20 corresponds to the "second planetary gear mechanism". The sun gear 21 corresponds to the "fourth rotary element". The carrier 22 corresponds to the "fifth rotary element". The ring gear 23 corresponds to the "sixth rotary element". The third planetary gear mechanism 30 corresponds to the "third planetary gear mechanism". The sun gear 31 corresponds to the "seventh rotary element". The carrier 32 corresponds to the "eighth rotary element". The ring gear 33 corresponds to the "ninth rotary element". The fourth planetary gear mechanism 40 corresponds to the "fourth planetary gear mechanism". The sun gear 41 corresponds to the "tenth rotary element". The carrier 42 corresponds to the "eleventh rotary element". The ring gear 43 corresponds to the "twelfth rotary element". The first coupling element 51 corresponds to the "first coupling element". The second coupling element 52 corresponds to the "second coupling element". The third coupling element 53 corresponds to the "third coupling element". The fourth coupling element 54 corresponds to the "fourth coupling element". The clutch C1 corresponds to the "first clutch". The clutch C2 corresponds to the "second clutch". The clutch C3 corresponds to the "third clutch". The brake B1 corresponds to the "first brake". The brake B2 corresponds to the "second brake". The brake B3 corresponds to the "third brake". The correspondence between the main elements of the embodiment and the main elements of the invention described in the "SUMMARY OF THE INVENTION" section does not limit the elements of the invention described in the "SUMMARY OF THE INVENTION" section, because the embodiment is an example given for the purpose of specifically describing the best mode for carrying out the invention described in the "SUMMARY OF THE INVENTION" section. That is, the invention described in the "SUMMARY OF THE INVENTION" section should be construed on the basis of the description in that section, and the embodiment is merely a specific example of the invention described in the "SUMMARY OF THE INVENTION" section.

While the best mode for carrying out the present invention has been described above by way of an embodiment, it is a matter of course that the present invention is not limited to the embodiment in any way, and that the present invention may be implemented in various forms without departing from the scope and sprit of the present invention.

Industrial Applicability

The present invention is applicable to the automatic transmission device manufacturing industry and so forth.

The invention claimed is:

1. An automatic transmission device that changes a speed of power input to an input member to output the power to an output member, characterized by comprising:
   a first planetary gear mechanism including first to third rotary elements that form a sequence of the first rotary element, the second rotary element, and the third rotary element when arranged in an order at intervals corresponding to gear ratios in a velocity diagram;
   a second planetary gear mechanism including fourth to sixth rotary elements that form a sequence of the fourth rotary element, the fifth rotary element, and the sixth rotary element when arranged in an order at intervals corresponding to gear ratios in a velocity diagram;
   a third planetary gear mechanism including seventh to ninth rotary elements that form a sequence of the seventh rotary element, the eighth rotary element, and the ninth rotary element when arranged in an order at intervals corresponding to gear ratios in a velocity diagram;
   a fourth planetary gear mechanism including tenth to twelfth rotary elements that form a sequence of the tenth rotary element, the eleventh rotary element, and the twelfth rotary element when arranged in an order at intervals corresponding to gear ratios in a velocity diagram;
   a first coupling element that couples the third rotary element and the eighth rotary element to each other;
   a second coupling element that couples the fifth rotary element and the eleventh rotary element to each other;
   a third coupling element that couples the sixth rotary element and the twelfth rotary element to each other;
   a fourth coupling element that couples the seventh rotary element and the tenth rotary element to each other;
   a first clutch that engages and disengages the first coupling element and the third coupling element with and from each other;
   a second clutch that engages and disengages the first rotary element and the third coupling element with and from each other;
   a third clutch that engages and disengages the first rotary element and the fourth rotary element with and from each other;
   a first brake that is disengageably engaged so as to hold the fourth rotary element stationary with respect to an automatic transmission device case;
   a second brake that is disengageably engaged so as to hold the ninth rotary element stationary with respect to the automatic transmission device case; and
   a third brake that is disengageably engaged so as to hold the fourth coupling element stationary with respect to the automatic transmission device case, wherein:
   the input member is connected to the second coupling element; and
   the output member is connected to the second rotary element.

2. The automatic transmission device according to claim 1, wherein:
   a first forward speed is established by engaging the second clutch, the first brake, and the second brake and disengaging the first clutch, the third clutch, and the third brake;
   a second forward speed is established by engaging the second clutch, the second brake, and the third brake and disengaging the first clutch, the third clutch, and the first brake;
   a third forward speed is established by engaging the second clutch, the third clutch, and the second brake and disengaging the first clutch, the first brake, and the third brake;
   a fourth forward speed is established by engaging the first clutch, the second clutch, and the second brake and disengaging the third clutch, the first brake, and the third brake;
   a fifth forward speed is established by engaging the first clutch, the third clutch, and the second brake and disengaging the second clutch, the first brake, and the third brake;
   a sixth forward speed is established by engaging the first clutch, the second clutch, and the third clutch and disengaging the first brake, the second brake, and the third brake;
   a seventh forward speed is established by engaging the first clutch, the third clutch, and the third brake and disengaging the second clutch, the first brake, and the second brake;
   an eighth forward speed is established by engaging the first clutch, the second clutch, and the third brake and disengaging the third clutch, the first brake, and the second brake;
   a ninth forward speed is established by engaging the first clutch, the second clutch, and the first brake and disengaging the third clutch, the second brake, and the third brake; and
   a reverse speed is established by engaging the third clutch, the first brake, and the second brake and disengaging the first clutch, the second clutch, and the third brake.

3. The automatic transmission device according to claim 1, wherein:
   the first planetary gear mechanism, the second planetary gear mechanism, the third planetary gear mechanism, and the fourth planetary gear mechanism are each constituted as a single-pinion planetary gear mechanism in which a sun gear, a ring gear, and a carrier are used as the three rotary elements;
   the first rotary element, the fourth rotary element, the seventh rotary element, and the tenth rotary element are each a sun gear;
   the second rotary element, the fifth rotary element, the eighth rotary element, and the eleventh rotary element are each a carrier; and
   the third rotary element, the sixth rotary element, the ninth rotary element, and the twelfth rotary element are each a ring gear.

4. The automatic transmission device according to claim 2, wherein:
the first planetary gear mechanism, the second planetary gear mechanism, the third planetary gear mechanism, and the fourth planetary gear mechanism are each constituted as a single-pinion planetary gear mechanism in which a sun gear, a ring gear, and a carrier are used as the three rotary elements;
the first rotary element, the fourth rotary element, the seventh rotary element, and the tenth rotary element are each a sun gear;
the second rotary element, the fifth rotary element, the eighth rotary element, and the eleventh rotary element are each a carrier; and
the third rotary element, the sixth rotary element, the ninth rotary element, and the twelfth rotary element are each a ring gear.

5. The automatic transmission device according to claim 1, wherein
the second planetary gear mechanism is provided on an outer peripheral side of the fourth planetary gear mechanism.

6. The automatic transmission device according to claim 2, wherein
the second planetary gear mechanism is provided on an outer peripheral side of the fourth planetary gear mechanism.

7. The automatic transmission device according to claim 3, wherein
the second planetary gear mechanism is provided on an outer peripheral side of the fourth planetary gear mechanism.

8. The automatic transmission device according to claim 4, wherein
the second planetary gear mechanism is provided on an outer peripheral side of the fourth planetary gear mechanism.

9. The automatic transmission device according to claim 1, wherein
the planetary gear mechanisms are disposed in an order of the first planetary gear mechanism, the second planetary gear mechanism, the fourth planetary gear mechanism, and the third planetary gear mechanism.

10. The automatic transmission device according to claim 2, wherein
the planetary gear mechanisms are disposed in an order of the first planetary gear mechanism, the second planetary gear mechanism, the fourth planetary gear mechanism, and the third planetary gear mechanism.

11. The automatic transmission device according to claim 3, wherein
the planetary gear mechanisms are disposed in an order of the first planetary gear mechanism, the second planetary gear mechanism, the fourth planetary gear mechanism, and the third planetary gear mechanism.

12. The automatic transmission device according to claim 4 wherein
the planetary gear mechanisms are disposed in an order of the first planetary gear mechanism, the second planetary gear mechanism, the fourth planetary gear mechanism, and the third planetary gear mechanism.

13. The automatic transmission device according to claim 1, wherein
the second brake is constituted as a dog brake.

14. The automatic transmission device according to claim 2, wherein
the second brake is constituted as a dog brake.

15. The automatic transmission device according to claim 3, wherein
the second brake is constituted as a dog brake.

16. The automatic transmission device according to claim 4, wherein
the second brake is constituted as a dog brake.

17. The automatic transmission device according to claim 5, wherein
the second brake is constituted as a dog brake.

18. The automatic transmission device according to claim 6, wherein
the second brake is constituted as a dog brake.

19. The automatic transmission device according to claim 9, wherein
the second brake is constituted as a dog brake.

20. The automatic transmission device according to claim 10, wherein
the second brake is constituted as a dog brake.

* * * * *